US009878637B2

(12) United States Patent
Simonini et al.

(10) Patent No.: US 9,878,637 B2
(45) Date of Patent: Jan. 30, 2018

(54) METHOD OF DOCKING AN ELECTRIC VEHICLE FOR CHARGING

(71) Applicant: Proterra Inc., Greenville, SC (US)

(72) Inventors: Matthew D. Simonini, Greenville, SC (US); Keyur Shah, Greenville, SC (US)

(73) Assignee: Proterra Inc., Greenville, SC (US)

( * ) Notice: Subject to any disclaimer, the term of this patent is extended or adjusted under 35 U.S.C. 154(b) by 0 days.

(21) Appl. No.: 14/980,672

(22) Filed: Dec. 28, 2015

(65) Prior Publication Data
US 2017/0182912 A1    Jun. 29, 2017

(51) Int. Cl.
B60L 15/20    (2006.01)
B60L 11/18    (2006.01)

(52) U.S. Cl.
CPC ........... *B60L 15/20* (2013.01); *B60L 11/1809* (2013.01)

(58) Field of Classification Search
None
See application file for complete search history.

(56) References Cited

U.S. PATENT DOCUMENTS

2013/0193918 A1*   8/2013   Sarkar ..................... B60L 3/04
                                                      320/109

FOREIGN PATENT DOCUMENTS

| DE | 102015202435 A1 | 8/2015 |
| EP | 2712762 A1 | 4/2014 |
| WO | WO 2014/174358 A2 | 10/2014 |

OTHER PUBLICATIONS

European Search report in European Patent Application No. 16206520.5 dated May 2, 2017.

* cited by examiner

*Primary Examiner* — Rami Khatib
*Assistant Examiner* — Gerrad A Foster
(74) *Attorney, Agent, or Firm* — Bookoff McAndrews, PLLC

(57) ABSTRACT

A method of docking an electric vehicle at a charging station may include identifying the vehicle as it approaches the charging station and transmitting a distance parameter from the charging station to the vehicle. The distance parameter may be a measure of distance. The method may also include determining a desired speed of the vehicle based on the distance parameter using an algorithm in the vehicle, and controlling the vehicle to attain the determined desired speed.

9 Claims, 3 Drawing Sheets

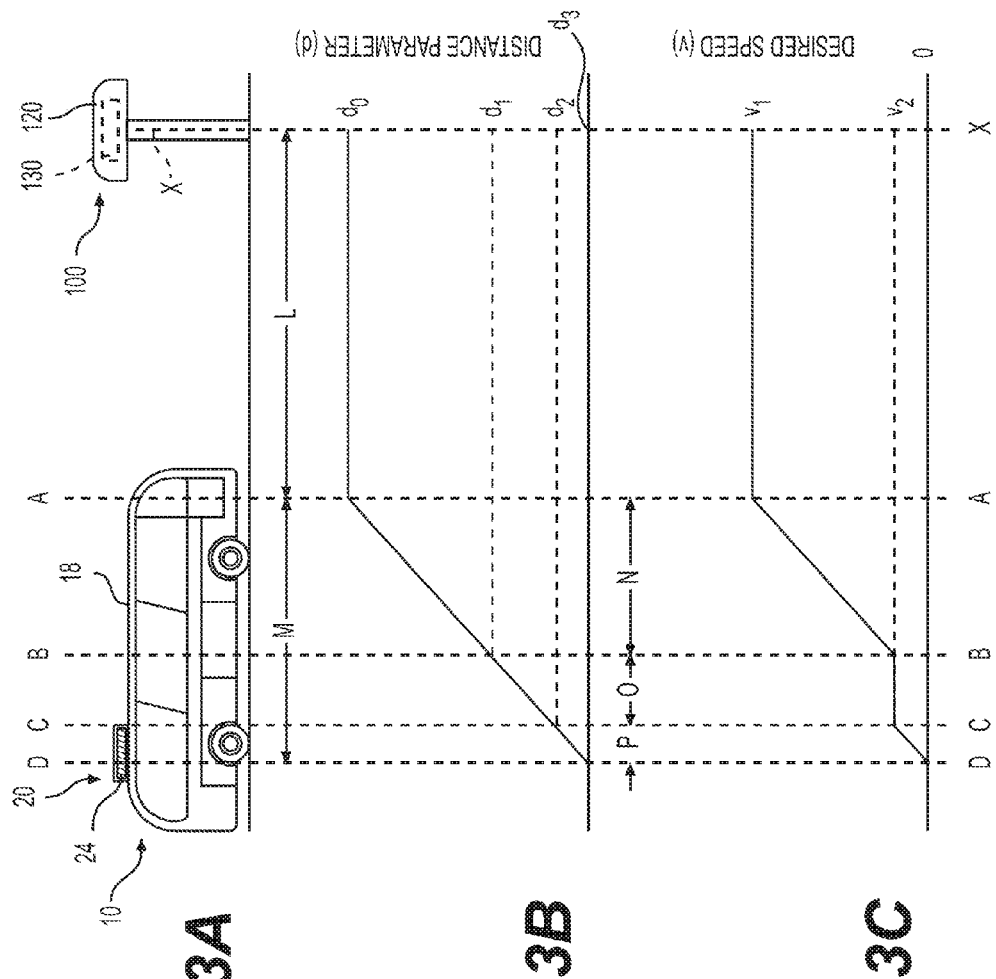

METHOD OF DOCKING AN ELECTRIC VEHICLE FOR CHARGING

TECHNICAL FIELD

The current disclosure relates to systems and methods for controlling the docking process of an electric vehicle with a charging station.

BACKGROUND

Electric vehicles, such as transit buses, are charged at charging stations. When a bus is positioned proximate a charging station, a charging arm of the charging station automatically engages with a charging interface of the bus to charge the bus. For proper engagement of the charging arm and the charging interface, the bus should be correctly positioned at the charging station. In some applications, the driver of the bus navigates and stops the bus at the charging station based primarily on sight. Improper positioning of the bus at the charging station will cause misalignment of the charging interface with respect to the charging arm and cause a delay in charging.

Embodiments of the current disclosure may alleviate the problems discussed above and/or other problems in the art. The scope of the current disclosure, however, is defined by the attached claims, and not by the ability to solve any specific problem.

SUMMARY

Embodiments of the present disclosure relate to systems and methods for controlling the docking of an electric vehicle with a charging station. Each of the embodiments disclosed herein may include one or more of the features described in connection with any of the other disclosed embodiments.

In one embodiment, a method of docking an electric vehicle at a charging station is disclosed. The method may include identifying the vehicle as it approaches the charging station and transmitting a distance parameter from the charging station to the vehicle. The distance parameter may be a measure of distance. The method may also include determining a desired speed of the vehicle based on the distance parameter using an algorithm in the vehicle, and controlling the vehicle to attain the determined desired speed.

In another embodiment, a method of docking an electric vehicle at a charging station is disclosed. The method may include identifying the vehicle as the vehicle approaches the charging station. The identifying may include determining whether the vehicle is supposed to be charged at the charging station. The method may also include determining a distance parameter at the charging station. The distance parameter may be related to a distance the vehicle has to travel before making electrical contact with the charging station. The method may further include transmitting the determined distance parameter from the charging station to the vehicle and determining a desired speed of the vehicle based on the distance parameter using an algorithm in the vehicle. The desired speed may be determined to be (a) a constant value for a first period of time, and (b) decreasing to a lower value for a second period of time. The method may additionally include controlling the vehicle to attain the desired speed.

In yet another embodiment, a method of docking an electric vehicle at a charging station is disclosed. The charging station may include a charge head configured to make electrical contact with vehicle electrodes positioned on a roof of the vehicle. The method may include determining a distance parameter at the charging station. The distance parameter may be determined based on a location of the vehicle electrodes with respect to the charge head as the vehicle moves under the charge head. The method may also include transmitting the determined distance parameter to the vehicle and lowering the charge head to land on the roof of the vehicle. The method may further include determining a desired speed of the vehicle based on the distance parameter using an algorithm in the vehicle. The desired speed may be determined to (a) a constant speed when the charge head is being lowered, and (b) zero when electrical contact is made between electrodes of the charge head and the vehicle electrodes. The method may additionally include controlling the vehicle to achieve the determined desired speed.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

FIG. 3A illustrates an exemplary docking process of the bus of FIG. 1 at a charging station;

FIG. 3B is a plot showing the distance parameters transmitted by the charging station to the bus during the exemplary docking process of FIG. 3A; and FIG. 3C is a plot showing the desired speed determined by the speed-determining algorithm in the bus during the exemplary docking process of FIG. 3A.

DETAILED DESCRIPTION

The present disclosure describes systems and methods for controlling the docking of an electric vehicle with a charging station. While principles of the current disclosure are described with reference to the docking of an electric bus with a charging station, it should be understood that the disclosure is not limited thereto. Rather, the systems and methods of the present disclosure may be used to control the docking of any vehicle (motorcycle, trains, cars, plane, etc.) for any purpose.

Figure 1:
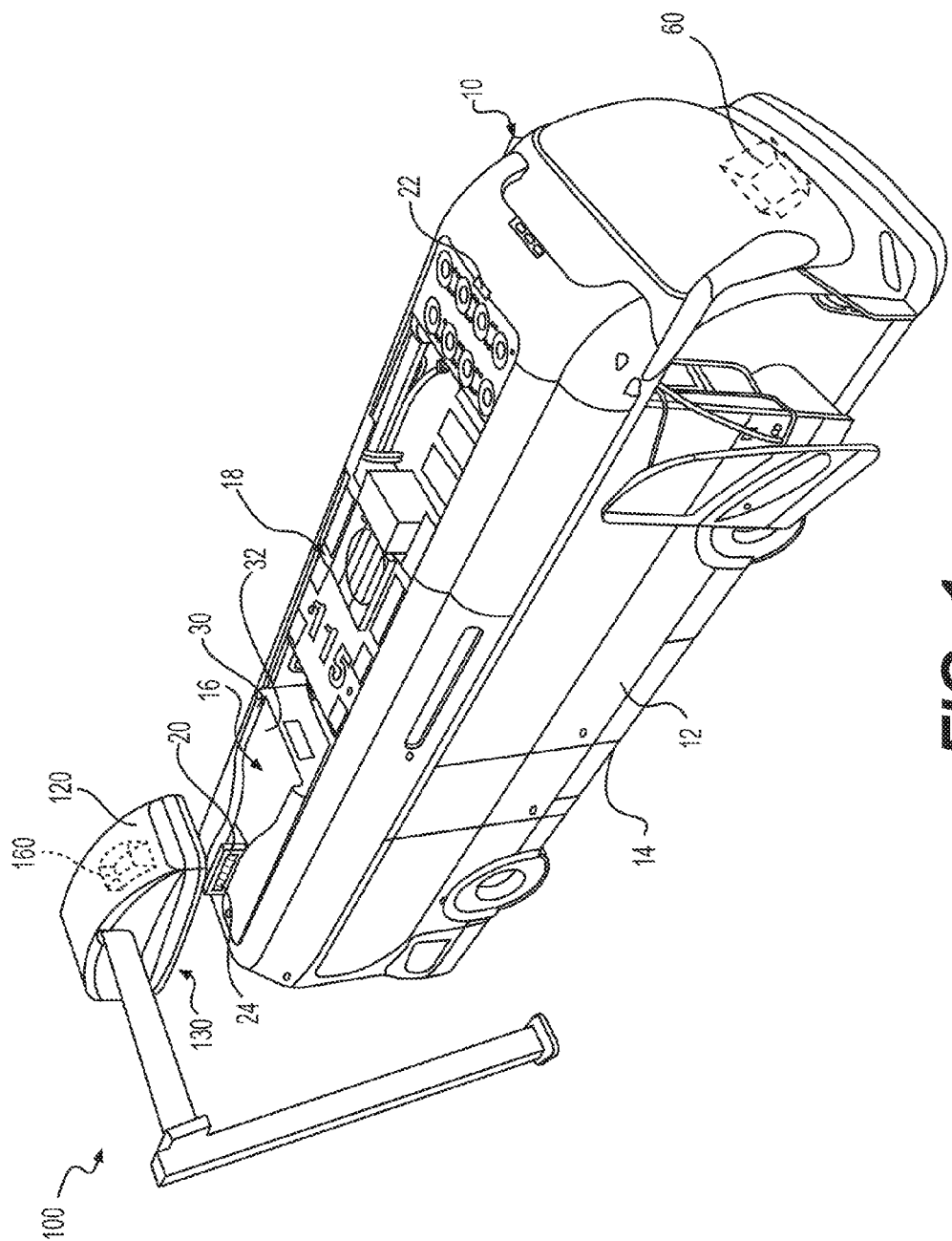
FIG. 1 illustrates an exemplary electric bus of the current disclosure.

FIG. 1 illustrates an electric vehicle in the form of an electric transit bus 10. Electric bus 10 may include a body 12 enclosing a space for passengers. In some embodiments, some (or all) parts of body 12 may be fabricated using composite materials to reduce the weight of bus 10. Without limitation, body 12 of bus 10 may have any size, shape, and configuration. In some embodiments, bus 10 may be a low-floor electric bus. As is known in the art, in a low-floor bus, there are no steps at the front and/or the back doors of the bus. In such a bus, the floor 14 of the bus 10 is positioned close to the road surface to ease entry and exit into the bus 10. In some embodiments, the floor height of the low-floor bus may be about 12-16 inches (30.5-40.6 cm) from the road surface. In this disclosure, relative terms such as "about," "substantially," "approximately," etc. are used to indicate a possible variation of ±10% in a stated numeric value.

Bus 10 may be propelled by an electric motor (not shown). A battery system 14 may store electrical energy to power the motor. In some embodiments, the batteries of the battery system 14 may be positioned under the floor of the bus 10. In some embodiments, the battery system 14 may be configured as a plurality of battery packs with each battery pack including multiple batteries. These battery packs may be positioned in cavities (not shown) located under the floor of the bus 10, and may be accessible from below the bus 10. The batteries may have any chemistry (lithium titanate oxide (LTO), nickel manganese cobalt (NMC), etc.) and construction. In some embodiments, the layout and design of the battery system 14 may enable fast charging. By fast charging, the battery system 14 may be recharged (to greater than about 95% state of charge) in less than or equal to about 10 minutes.

A charging interface 16 may be provided on the roof 18 of the bus 10 (or elsewhere) to charge the battery system 14. The charging interface 16 may include components that interface with a charge head assembly 120 of an external charging station 100 to charge the battery system 14. These components may include a charging blade 20 and a funnel-shaped alignment scoop 30. The charging blade 20 may support electrodes 24 that are connected to the battery system 14. To charge the bus, when the bus 10 is positioned under the charge head assembly 120, a charge head 130 of the charge head assembly 120 may descent and land on a landing zone 32 of the charging interface 16. With the charge head 130 on the landing zone 32, the bus 10 is moved until electrical contact is made between the electrodes (not shown) of the charge head 130 and the electrodes 24 of the charging blade 20. Charging of the bus 10 may be initiated after electrical contact is made. As the bus moves forward, the funnel-shaped alignment scoop 30 may urge the charge head 130 towards alignment with the charging blade 20. The funnel shape of the alignment scoop 30 enables the charging system to tolerate some amount of lateral misalignment between the charge head 130 and the charging blade 20.

Bus 10 may include a control system 60 and charging station 100 may include a control system 160 that are configured to control, among others, the charging operations of the bus 10. Control system 60 may be an integrated master control system that controls several operations of the bus 10. In some embodiments, control system 60 may be a distributed control system. That is, the functions of control system 60 may be divided between several different control systems (e.g., power train control system, vehicle control system, energy storage master control system, etc.) of the bus 10. Similarly, control system 160 of charging station 100 may also be an integrated master control system or a distributed control system housed at the same or different locations (the structure of the charging station 100 or elsewhere).

Electric bus 10 may be a transit bus that operates along a fixed route in a geographic area (city, town, airport, campus, etc.). Bus 10 may continuously travel on the route picking up and dropping off passengers at several bus stops along the route. One or more charging stations 100 may be located in bus stops or on the route to charge the buses 10. The charge head assembly 120 of each charging station 100 may overhang a surface (e.g., road) that the bus 10 travels on. The charging station 100 may be coupled to an electric grid that is supplied with electrical energy by a utility company. Single phase or three-phase AC current from the electrical grid may be converted into DC current and directed into the charge head assembly 120. The charging station 100 may include electrical components (e.g., rectifier, power converter, switches, safety mechanisms, etc.) to convert the AC current from grid to DC current for the charge head assembly 120. In some embodiments, a bus 10 may dock with the charging station 100 and charge while passengers enter and exit the bus 10.

Figure 2:
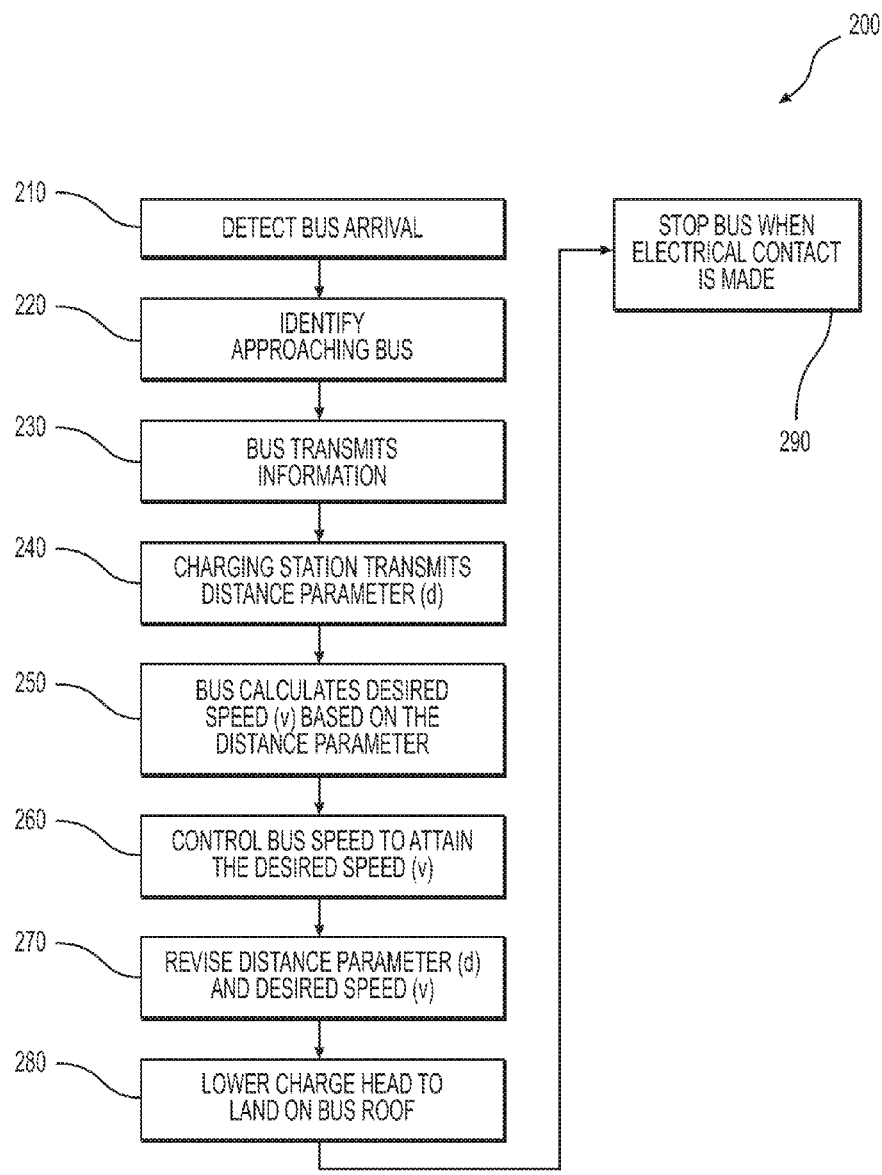
FIG. 2 is a flow chart that illustrates a method of docking the bus at a charging station.

FIG. 2 illustrates an exemplary docking process 200 of the bus 10 at the charging station 100. When a bus 10 approaches the bus stop 50, control system 160 of the charging station 100 may detect the arrival of the bus 10 (step 210). In some embodiments, the identification of the bus 10 may include the establishment of a low-level wireless communication link between the bus 10 (or a control system of the bus) and the charging station 100. Due to this low-level communication link, the charging station 100 may be aware of the presence of the bus 10 but may not be configured to begin one on one communication with the bus 10. In some embodiments, a signal emitter in the bus 10 may transmit a signal that may be detected by the charging station 100 to indicate bus arrival. In some embodiments, depending on the bus speed, the charging station 100 may detect the arrival of the bus 10 when the bus is about 100-200 feet away from the charging station 100. However, this distance is only exemplary, and the arrival of the bus 10 may be detected by the charging station 100 from any distance.

As the bus 10 continues to approach the charging station 100, the control system 160 of the charging station 100 may identify the approaching bus 10 (step 220). In general, the bus may be identified by any known method (communication with the driver, etc.). In some embodiments, the bus 10 may be automatically identified. In some such embodiments, an RFID (radio-frequency identification) reader in the charging station 100 (e.g., in the charge head assembly 120) may read the bus-identification information (ID) programmed into an RFID tag 22 in the bus (see FIG. 1). In some embodiments, depending on the bus speed, the RFID reader may read the ID when the bus 10 is between about 0-20 feet (0-65.5 meters) from the charging station 100. In some embodiments, the charging station 100 may broadcast the detected ID to the approaching bus 10 for confirmation. Upon receipt of this broadcast message, the bus 10 may confirm the ID by retransmitting its ID or concurrence to the charging station 100. Once the ID is confirmed, a high-level wireless communication link (which enables one-one communication) may be established between the bus and the charging station 100 and the automatic docking process begins.

Based on the ID, the control system 160 of the charging station 100 may confirm that the approaching bus 10 is a bus that is configured to be charged at the charging station 100 (and not a different type of bus). In some embodiments, the control system 160 may also use the ID to configure the charging station 100 to service the approaching bus 10. For example, based on the bus height associated with the ID, the control system 160 may determine the distance by which the charge head 130 of the charge head assembly 120 descends to land on the roof 18 of the approaching bus 10. If the ID is not read, or if the ID indicates that the bus 10 is not supposed to be charged at the charging station 100, no further action is taken, and the bus is allowed to proceed.

After the bus 10 is conclusively identified as a bus that is configured to be charged at the charging station 100, the bus 10 and the charging station 100 may exchange information. The bus 10 may transmit information such as its speed, ignition switch position, parking brake position, gear position, length, etc. to the charging station 100 (step 230). Based at least partly on this information, the control system 160 of the charging station 100 may compute a distance parameter (d) and transmit this parameter d to the bus 10.

The distance parameter may be a numerical value based on the distance that the bus has to travel before electrical contact is made with the charging station 100. In some embodiments, the distance parameter may be an estimate of the current distance between the electrodes 24 of the bus 10 (on blade 20) and the electrodes of the charging station 100 (on charge head 130). In some embodiments, the distance parameter may be a predetermined value (i.e., a constant value programmed into the control system) assigned to this variable by the control system 160.

The control system 60 of the bus 10 may receive the distance parameter transmitted by the charging station 100 and calculate/determine a bus speed (v) using a speed-determining algorithm (step 250). This algorithm may be stored in the control system 60 and may determine the speed at which the bus 10 should travel so that the bus 10 can smoothly come to a stop at a desired location of the charging station 100. The control system 60 may vary the electric current input to the motor of the bus 10 to achieve this determined speed value (v) (step 260). For example, tables or maps stored in the control system may correlate the speed of the bus 10 to the value of current input to the motor at different torques. Based on this information, an inverter associated with the power train of the bus 10 may activate IGBTs (insulated-gate bipolar transistors) to vary the current to the electric motor to attain the algorithm-determined speed (v).

In some embodiments, the charging station 100 may continuously update (i.e., in real-time) and transmit the updated distance parameter until the bus 10 comes to a stop. In some embodiments, the charging station 100 may only revise the transmitted distance parameter sporadically, such as, when the bus 10 passes selected landmarks on its way to the charging station 100. In some embodiments, these landmarks may include sensors that indicate, to the control system 160, the location of the bus 10 with respect to the landmark. For example, if the bus 10 passes a first landmark and second landmark on its way to the charging station 100, the distance parameter transmitted by the charging station 100 when the bus 10 is positioned between the first and second landmarks may be based on the distance of the first landmark from the charging station. As the bus 10 passes the second landmark, the control system 160 may revise the distance parameter based on the distance of the second landmark from the charging station 100, and transmit this revised distance parameter until it passes another landmark when the distance parameter is again revised.

In some embodiments, when the front of the bus 10 passes under the charge head assembly 120 of the charging station 100, the control system 160 may detect the location of the bus more accurately and recalculate the distance parameter. In some embodiments, an ultrasonic sensor (or another type of sensor) may be positioned on the charge head assembly 120. This ultrasonic sensor may be configured to identify different structural features (e.g., HVAC unit, radiator, etc.) on the roof of the bus 10 and accurately determine the location of these features with respect to the charge head 130. Based on the identification of these features, the control system 160 may revise the distance parameter and transmit this revised value to the bus 10. Based on this revised distance parameter, the control system 60 of the bus 10 may recalculate the desired speed (v) and control the motor to attain this speed (step 270).

When a desired region of the roof 18 passes under the charge head assembly 120, the charge head 130 may be lowered to land on the roof 18 of the bus 10 (step 280). In some embodiments, lowering of the charge head 130 may be initiated when the ultrasonic sensor (on the charge head assembly 130) identifies a selected feature on the roof 18. As the charge head 130 descends, the algorithm-calculated speed may be such that the charge head 130 lands on the roof 18 before the charge head 130 reaches the charging blade 20. With the charge head 130 resting on the roof 18, the bus 10 is moved forward at an algorithm-calculated speed until the electrodes of charge head 130 make satisfactory electrical contact with the electrodes 24 on the charging blade 20. In some embodiments, a pilot signal may indicate that satisfactory electrical contact has been made. The bus 10 is then stopped and charging is begun (step 290).

FIG. 3A-3C illustrate the variation of the distance parameter and the algorithm-calculated speed as a function of the bus position in one exemplary embodiment. FIG. 3A illustrates the bus 10 approaching the charging station 100 and identifies different locations on the bus 10 (A, B, C, D) that are of interest in the discussions below. FIGS. 3B and 3C illustrate the distance parameter transmitted by the charging station 100 and the speed (v) calculated by the algorithm, respectively, when the identified locations of the bus 10 (in FIG. 3A) reach the location marked X under the charge head assembly 120 (i.e., when these locations are positioned directly under the charge head assembly 120).

In the discussion that follows, reference will be made to FIGS. 2 and 3A-3C. After it is confirmed that the approaching bus 10 is to be charged at the charging station 100 (i.e., step 220 of FIG. 2), the control system 160 may assign a value of $d_0$ to the distance parameter and transmit this parameter to the bus 10 (see step 240). In general, $d_0$ can be any value. In some embodiments, $d_0$ may correspond to the length of the bus 10. In some embodiments, $d_0$ may be the distance of the bus 10 from the charging station (i.e., from location X) when the ID information is received from the bus 10. The speed-determining algorithm in the control system 60 (of the bus 10) may then determine a desired speed $v_1$ for the bus 10 based on the received distance parameter (see step 250). In some embodiments, the algorithm may assign a predetermined constant value (i.e., 10 miles/hour, 8 miles/hour, etc.) for speed $v_1$ based on the value of $d_0$. In some embodiments, the speed of the bus 10 when the bus ID is received by the control system 160 may be assigned as the value of $v_1$.

In some embodiments, as illustrated in FIG. 3B, the charging station 100 may continue to transmit $d_0$ as the value of the distance parameter until location A (beginning of the roof 18) of the bus reaches location X of the charging station 100 (see the region marked L in FIG. 3B). Based on this distance parameter, the speed-determining algorithm may continue to output $v_1$ as the desired speed in this region (see the region marked L of FIG. 3C). When location A of the bus 10 reaches location X of the charging station 100 (i.e., when location A of the bus 10 is positioned directly below the charge head assembly 120), the ultrasonic sensor on the charge head assembly 120 may begin to detect structural features on the roof 18 of the bus 10, and use this information to determine the bus location more accurately. Based on this more accurate location, the control system 160 may revise the value of the distance parameter, and transmit this revised distance parameter to the bus 10 (see step 270).

As the bus 10 moves under the charge head assembly 120, the control system 160 may continue to use the features recognized by the ultrasonic sensor to determine and transmit updated distance parameters (see region marked M in FIG. 3B) to the bus 10. In some embodiments, the actual vehicle speed information is transmitted from the bus 10 to the charging station 100. This data may be used to update the distance parameter (in addition to the roof profile features). The vehicle speed may be integrated by charging station 100 to determine the distance travelled. Therefore, the distance parameter is continuously updated even when there is no roof profile feature. The roof profile features may be used to reset the distance parameter when the there is a difference between the calculated value and the true distance. Based on these updated distance parameters, the speed-determining algorithm may determine the desired speed (v) for the bus, and control the current to the motor to attain this speed. When the control system 160 detects that location B of the bus 10 has reached location X of the charging station 100, it may begin lowering the charge head 130 (see step 280). The speed-determining algorithm may control the speed of the bus such that the charge head 130 lands on the roof 18 in front of the blade 20. The algorithm may then control the speed so that the bus stops in a smooth manner when electrical contact is made between the electrodes of the charge head 130 and the electrodes 24 of the blade 20.

As illustrated in FIG. 3C, the speed-determining algorithm may determine the desired bus speed (v) as any function of the distance parameter received from the charging station control system 160. In some embodiments, as illustrated in FIG. 3C, when the bus 10 moves under the charge head assembly 130 from location A to location B (where the charge head 130 begins to descend) (see region N of FIG. 3C), the algorithm linearly decreases the desired speed from $v_1$ to $v_2$. That is, as the distance parameter received by the bus 10 changes from $d_0$ at location A to $d_1$ at location B, the speed output by the algorithm changes linearly from $v_1$ to $v_2$. Speed $v_2$ may be a preprogrammed value of speed that the bus is desired to be travelling at when the charge head 130 descends. As location C (the front end of the blade 20) of the bus 10 moves under the charge head assembly 120 (i.e., to location X), the distance parameter transmitted by the charging station 100 changes from $d_1$ and $d_2$. As illustrated in FIG. 3C, in some embodiments, the algorithm may be configured to keep the desired speed of the bus 10 constant at $v_2$ as the received distance parameter changes from $d_1$ to $d_2$.

When location C of the bus 10 is at location X of the charging station 100, the electrodes of the charge head 130 begin to engage with the electrodes 24 of the blade 20. When the bus moves further (from locations C to D), the charge head electrodes slide on (or scrape against) the bus electrodes 24. This sliding or scraping action cleans the electrodes by removing oxide layers and other undesirable coatings (dirt and grime) formed on the electrode surfaces. When location D of the bus 10 reaches location X of the charging station, the electrodes of the charge head 130 may have good electrical contact with the electrodes 24 of the blade 20. As the bus moves from location C to D, the distance parameter output by the charging station 100 varies from $d_2$ and $d_3$, and the corresponding speed output by the algorithm changes decreases from $v_2$ to zero. That is, the bus is brought to rest with the electrodes of the charge head 130 in good electrical contact with the electrodes 24 of the blade 20. Although not a limitation, in some embodiments, distance parameter $d_3$ may also be zero.

It should be noted that the distance parameter plot of FIG. 3B and the algorithm-calculated speed plot of FIG. 3C are only exemplary. In general, the distance parameter and the algorithm-calculated speed may vary in any manner. For example, in some embodiments, instead of initially equating $d_0$ (the distance parameter when the bus ID is confirmed) to the length of the bus, the control system 160 may determine and assign to $d_0$, the actual distance between the location D of the bus 10 and location X when the bus ID is confirmed. In such embodiments, the speed-determining algorithm may assign to $v_1$, a speed value that can be smoothly decreased to zero within this distance. In some embodiments, after confirming the bus ID, the control system 160 may determine the location of the bus 10 at multiple points as it travels towards the charging station 100 (in region L of FIG. 3B), and revise the distance parameter with the updated distance. Based on the updated distance parameter values, the algorithm may decrease the speed in region L of FIG. 3C.

Although FIG. 3C illustrates the speed (v) as being reduced linearly from $v_1$ to a predetermined value $v_2$ in region N, this is only exemplary. In some embodiments, the algorithm may be configured to reduce the speed along a non-linear curve. It is also contemplated that, in some embodiments, the algorithm may cause the bus 10 to stop (i.e., output a value of zero for speed v) as the charge head 130 is being lowered. In such embodiments, the algorithm may cause the bus to resume movement to location D after the charge head 130 has landed.

In some embodiments, the control system, 60 of the bus 10 may automatically drive the bus at the speed determined by the algorithm. In such embodiments, the driver of the bus may navigate (i.e., steer) the bus 10 while its speed may be controlled by the control system 60. The driver may still be able to stop the bus by applying the brakes. In some embodiments, the algorithm-determined speed may be set as a maximum permissible speed by the control system 60. In such embodiments, the driver of the bus may step on the accelerator to move the bus, but its maximum speed may be limited to the value determined by the algorithm.

While the current disclosure describes a docking process of an electric bus with a charging station, it should be understood that the disclosure is not limited thereto. Rather, the principles described herein may be employed to control the speed of a vehicle and stop the vehicle at any desired location using a vehicle based algorithm that calculates a desired vehicle speed based on a distance-related parameter received from an external source. For example, the disclosed approach can be used to stop an inductively charged vehicle directly above a charging pad. Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description. For example, while certain features have been described in connection with various embodiments, it is to be understood that any feature described in conjunction with any embodiment disclosed herein may be used with any other embodiment disclosed herein.

We claim:

1. A method of docking an electric vehicle at a charging station, comprising:
   computing a distance parameter using a control system of the charging station at multiple times, the distance parameter at each time of the multiple times being indicative of a distance that an approaching vehicle has to travel to make electrical contact with the charging station at that time;
   transmitting the computed distance parameter from the control system of the charging station to a control unit of the vehicle;
   receiving the distance parameter computed by the control system of the charging station at the control unit of the vehicle;

calculating a desired speed of the vehicle, using the control unit of the vehicle, based on the received distance parameter, wherein
  (a) the desired speed calculated using the distance parameter computed at a first time of the multiple times is a first constant value of speed,
  (b) the desired speed calculated using the distance parameter computed at a second time of the multiple times decreases from the first constant value to a second value of speed, and
  (c) the desired speed calculated using the distance parameter computed at a third time of the multiple times is a third constant value of speed lower than the first constant value; and
automatically controlling a speed of the vehicle to attain the calculated desired speed.

2. The method of claim 1, further including lowering a charge head of the charging station to rest on a roof of the vehicle when the desired speed is at the third constant value.

3. The method of claim 1, wherein (d) the desired speed calculated using the distance parameter computed at a fourth time of the multiple times decreases from the third constant value to zero.

4. The method of claim 3, further including sliding electrodes of the charging station on electrodes of the vehicle when the desired speed is decreasing from the third constant value to zero.

5. The method of claim 1, wherein the electric vehicle is a bus.

6. A method of docking an electric vehicle at a charging station, comprising:
  computing a distance parameter using a control system of the charging station at multiple times, the distance parameter at each time of the multiple times being indicative of a distance that an approaching vehicle has to travel to make electrical contact with the charging station at that time;
  transmitting the computed distance parameter from the control system of the charging station to a control unit of the vehicle;
  receiving the distance parameter computed by the control system of the charging station at the control unit of the vehicle;
  calculating a desired speed of the vehicle, using the control unit of the vehicle, based on the received distance parameter, wherein
    (a) the desired speed calculated using the distance parameter computed at a first time of the multiple times is a first constant value of speed,
    (b) the desired speed calculated using the distance parameter computed at a second time of the multiple times decreases from the first constant value to a second value of speed,
    (c) the desired speed calculated using the distance parameter computed at a third time of the multiple times is a third constant value of speed lower than the first constant value, and
    (d) the desired speed calculated using the distance parameter computed at a fourth time of the multiple times decreases from the third constant value to zero; and
  automatically controlling a speed of the vehicle to attain the calculated desired speed.

7. The method of claim 6, further including lowering a charge head of the charging station to rest on a roof of the vehicle when the desired speed is at the third constant value.

8. The method of claim 6, further including sliding electrodes of the charging station on electrodes of the vehicle when the desired speed is decreasing from the third constant value to zero.

9. The method of claim 6, wherein the electric vehicle is a bus.

* * * * *